United States Patent
Qiu et al.

(10) Patent No.: US 10,546,414 B2
(45) Date of Patent: Jan. 28, 2020

(54) FAST WINDOW-LEVELING OF VOLUMETRIC RAY TRACING

(71) Applicant: Siemens Healthcare GmbH, Erlangen (DE)

(72) Inventors: Feng Qiu, Pennington, NJ (US);
Daphne Yu, Yardley, PA (US)

(73) Assignee: Siemens Healthcare GmbH, Erlangen (DE)

( * ) Notice: Subject to any disclaimer, the term of this patent is extended or adjusted under 35 U.S.C. 154(b) by 38 days.

(21) Appl. No.: 15/172,971

(22) Filed: Jun. 3, 2016

(65) Prior Publication Data
US 2017/0352180 A1    Dec. 7, 2017

Related U.S. Application Data

(60) Provisional application No. 62/295,812, filed on Feb. 16, 2016.

(51) Int. Cl.
*G06T 15/06*    (2011.01)

(52) U.S. Cl.
CPC .................... *G06T 15/06* (2013.01)

(58) Field of Classification Search
CPC .................................... G06T 15/06
USPC .......................................... 345/424
See application file for complete search history.

(56) References Cited

U.S. PATENT DOCUMENTS

| | | | | |
|---|---|---|---|---|
| 2007/0262989 A1* | 11/2007 | Buyanovskiy | .......... | G06T 15/06 345/426 |
| 2009/0303236 A1* | 12/2009 | Buyanovskiy | .......... | G06T 15/08 345/426 |
| 2016/0180525 A1* | 6/2016 | Reynolds | .................. | G06T 7/11 382/131 |
| 2016/0269723 A1* | 9/2016 | Zhou | ....................... | G06T 15/06 |

OTHER PUBLICATIONS

Lafortune E.P., Willems Y.D. (1995) A 5D Tree to Reduce the Variance of Monte Carlo Ray Tracing. In: Hanrahan P.M., Purgathofer W. (eds) Rendering Techniques '95. Eurographics. Springer, Vienna.*
Zaninetti, Jacques, Pierre Boy, and Bernard Peroche. "An Adaptive Method for Area Light Sources and Daylight in Ray Tracing." Computer Graphics Forum 18.3 (1999): 139-150.*
Csebfalvi, Balazs; et all; "Monte Carlo Volume Rendering" ;IEEE Visualization; Oct. 19, 2003; pp. 449-456.

* cited by examiner

*Primary Examiner* — Shivang I Patel

(57) ABSTRACT

A computer-implemented method for performing window-leveling of volumetric ray tracing includes a computer system retrieving a quad-tree data structure organizing a plurality of light paths associated with a volume rendered using a transfer function and one or more window level values. The computer system also receives a user selection of at least one of a new transfer function or new window level values. The volume is rendered by the computer system with the new transfer function or the new window level values using the quad-tree data structure. Then, the computer system synthesizes an image by adding contributions from all of the plurality of light paths according to the quad-tree data structure.

15 Claims, 7 Drawing Sheets

FAST WINDOW-LEVELING OF VOLUMETRIC RAY TRACING

TECHNICAL FIELD

The present disclosure relates generally to methods, systems, and apparatuses for accelerating ray tracing during image volume rendering processes. The techniques may be applied to, for example, to accelerate volume rendering in medical imaging applications.

BACKGROUND

Volume rendering refers to a set of computer graphic techniques used to display a 2D projection of a 3D discretely sampled data set. The contents of this data set are dependent on the acquisition source of the data. For example, in the domain of medical imaging, the 3D data set typically includes a plurality of 2D slice images acquired by a Computed Tomography (CT) or Magnetic Resonance Imaging (MRI) scanner.

Ultra-realistic volume rendering can provide maximal benefits in distinguishing fine tissue characteristics in medical imaging. Quite often, the user needs to carefully window and level the rendering transfer function to fine tune the data to reveal the salient information. For instance, an image may reveal lesions within the liver or fine lung structure only within a very narrow range of intensity values.

Unfortunately, conventional ultra-realistic volume rendering technologies today are based on path tracing or ray tracing and, as such, requires many compromises on quality during interactions on most computing systems. This greatly limits the usability of such rendering for precision windowing. Thus, it is desired to improve rendering speed when changing transfer function and window levels, without sacrificing quality.

SUMMARY

Embodiments of the present invention address and overcome one or more of the above shortcomings and drawbacks, by providing methods, systems, and apparatuses related to the acceleration of ray tracing during image volume rendering processes.

According to some embodiments, a computer-implemented method for performing window-leveling of volumetric ray tracing includes a computer system retrieving a quad-tree data structure organizing a plurality of light paths associated with a volume rendered using a transfer function and one or more window level values. The computer system also receives a user selection of at least one of a new transfer function or new window level values. The volume is rendered by the computer system with the new transfer function or the new window level values using the quad-tree data structure. Then, the computer system synthesizes an image by adding contributions from all of the plurality of light paths according to the quad-tree data structure.

In some embodiments of the aforementioned method, a quad-tree generating process is performed to generate the quad-tree. This process includes tracing a plurality of rays in the volume according to the transfer function and generating a plurality of paths based on the plurality of rays. Maximum and minimum intensities are computed for each of the plurality of light paths. Then, the light paths and the maximum and minimum intensities for each of the light paths are organized into the quad-tree data structure. In some embodiments, the computer system is a parallel computing platform and the plurality of rays in the volume are traced in parallel. During the process, the rays may be traced, for example, using a Monte Carlo Ray Tracing (MCRT) algorithm. MCRT algorithm may trace the rays in the volume using a transfer function that linearly maps minimum volume intensity to 0 and maximum volume intensity to 1 or, alternatively, using a constant transfer function.

In some embodiments, the quad-tree generating process performed during the method discussed above further includes computing an extinction factor for each of the plurality of light paths and storing the extinction factors in the quad-tree data structure. Additionally, the quad-tree generating process may further comprise identifying a subset of the plurality of light paths wherein, for each respective path in the subset, light source intensity is not constant for all rays in the respective path. Intensity information may then be stored for each respective path in the subset in the quad-tree data structure.

In some embodiments of the aforementioned method, the volume is rendered with the new transfer function or the new window level values by processing each respective node in the quad-tree data structure with a path integral calculation process. During this path integral calculation process, if the maximum and minimum intensities corresponding to the respective node are on a horizontal line segment, contributions are computed for all paths under the respective node using a first integral function which assumes a constant transfer function. However, if the maximum and minimum intensities corresponding to the respective node are on a one slope line segment of the new transfer function, contributions are contributed for all paths under the respective node using a second integral function which is based on an affine transformation between the transfer function and the new transfer function. Additionally, if the respective node is not a leaf node, children nodes of the respective node are traversed using the path integral calculation process. However, if the respective node is a leaf node, a path integral is computed for the respective node. In embodiments where the computer system is a parallel computing platform, the path integral calculation process may be performed on multiple nodes in the quad-tree data structure in parallel.

According to other embodiments, an article of manufacture for performing window-leveling of volumetric ray tracing comprises a non-transitory computer-readable medium holding computer-executable instructions for performing the aforementioned method, with or without the additional features set out above.

According to other embodiments, a system for performing window-leveling of volumetric ray tracing comprises a database and a plurality of processors. The database is configured to store a tree data structure (e.g., a quad-tree data structure) organizing (i) a plurality of light paths associated with a volume rendered using a transfer function and one or more window level values and (ii) maximum and minimum intensities for each of the plurality of light paths. The processors are configured to render the volume with a new transfer function or new window level values using the tree data structure by processing each respective node in the tree data structure with the path integral calculation process discussed above. In some embodiments, the path integral calculation process is performed on multiple nodes in the tree data structure in parallel by the plurality of processors.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION

Figure 1:
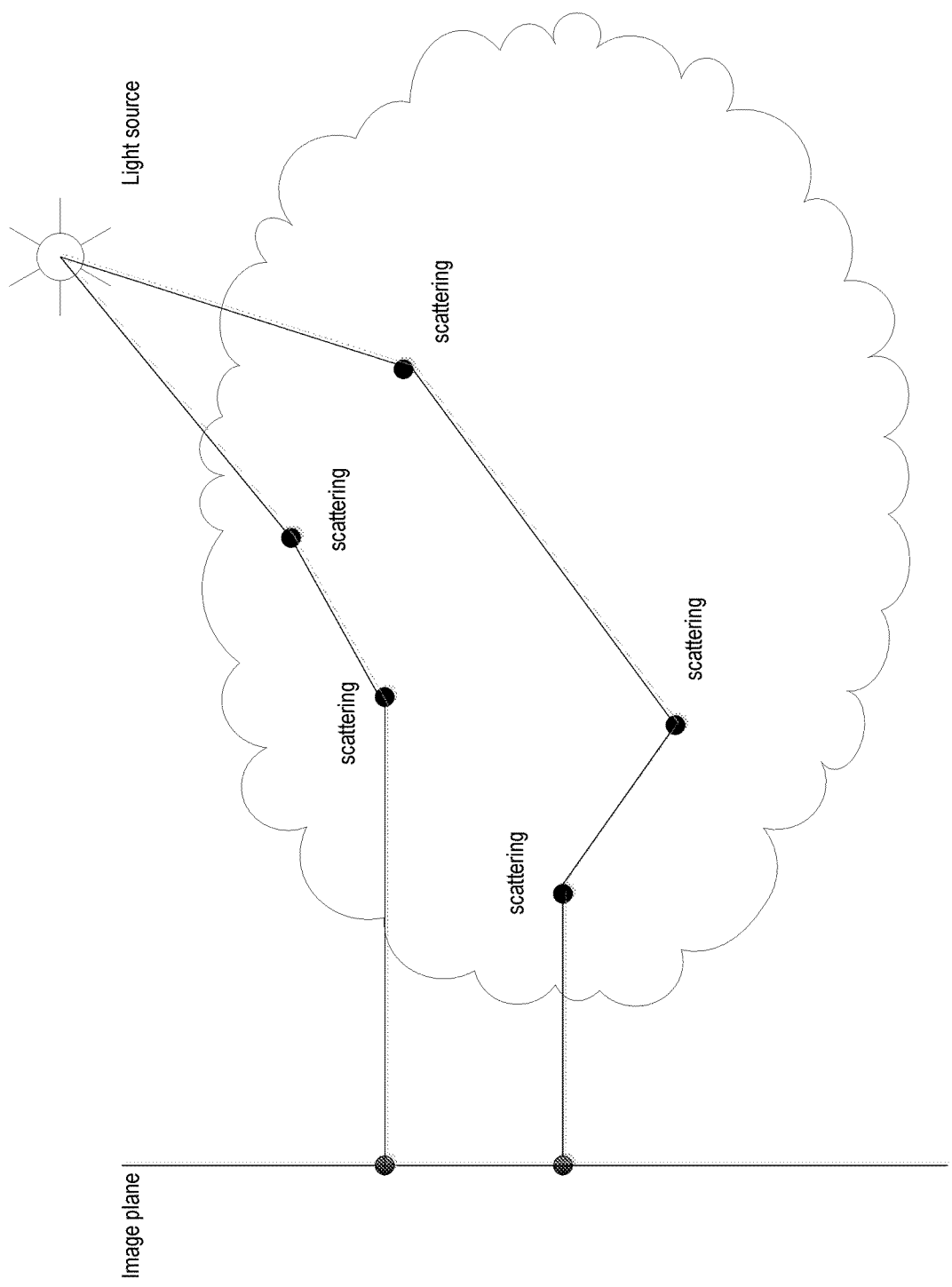
FIG. 1 shows an illustration of a light path in a volume.

The following disclosure describes the present invention according to several embodiments directed at methods, systems, and apparatuses for performing fast window-leveling of volumetric ray tracing. More specifically, the techniques described herein accelerate the Monte Carlo ray tracing for volume rendering. The piecewise linear transfer function properties are exploited to simplify the computation of the extinction factor of light paths. Depending on the transfer function complexity, this may improve the rendering speed significantly for window-leveling and changing transfer function. Additionally, the techniques described herein do not lose any image quality for these operations, even for the global illumination effect.

Monte Carlo Ray Tracing (MCRT) simulates interactions between light photons casted from the view point to the volume structure. There are three forms of photon-volume interactions: absorption (light absorbed by the volume); emission (light emitted from the volume); and scattering (light direction changed by the volume). Thus, each light photon could scatter to a random direction when it encounters the samples within the volume. According to a random probability which is a function of the volume intensity, the photon may also be absorbed and thereby not contribute to the final image.

The scattering probability and the new photon direction may be computed with a function of the density of the encountered sample (phase function). The following differential equation accounts for these interactions:

$$\frac{dI(x, \omega)}{ds} = -\sigma_t(x, \omega)I(x, \omega) + \qquad \text{(Eqn. 1)}$$

$$\sigma_e(x, \omega)I(x, \omega) + \sigma_s(x, \omega)\int_\Omega f(x, \omega, \omega')I(x, \omega')d\omega'$$

where the extinction function $\sigma_t(x, \omega)$ represents absorption and out-scattering, $\sigma_e(x, \omega)$ is the emission probability function, $\sigma_s(x, \omega)$ is the scattering probability function, and $f(x, \omega, \omega')$ is the phase function. For medical visualization, the volume itself typically does not emit any light. Instead, light source(s) outside the volume is used to illuminate the volume. The probability functions are typically simplified as a 1D transfer function of the volume intensity at the 3D sampling position. Also, the absorption function can also be ignored and the extinction function is same as the scattering function.

The differential equation set out above in Equation 1 does not have an analytic solution. In theory, if an algorithm could trace all possible paths from the light source to a point on the image plane, the accurate illumination for the point may be determined. However, in practice, this is impossible. Instead, the Monte Carlo method can be applied to compute a subset of all paths and estimate the result. In Monte Carlo ray tracing method, multiple photons are shot from each pixel to the scene. These photons then interact with the volume. As the number of photons increased, the average light intensities accumulated for photons converge to the numerical solution of the pixel color.

FIG. 1 illustrates a light path in a volume. The path of a light photon is a polyline that starts from a pixel on the image (first vertex) and ends at the light source (the last vertex). Each intermediate vertex represents a scattering event that changes the photon direction. The contribution of a photon path to the target pixel accounts for the light emitted from the light source at position y from direction $\omega'$, scattering by the volume along the path, and finally arrives at the pixel at position x through viewing direction $\omega$, which can be computed by the path integral:

$$I(x, \omega) = I^0(y, \omega') \cdot e^{-\int_{s_0}^{s_1} \sigma_s(x)dx} \qquad \text{(Eqn. 2)}$$

In Equation 2, $$e^{-\int_{s_0}^{s_1} \sigma_s(x)dx}$$

is defined as the extinction factor of the path. Generally, this equation doesn't have a solution and must be computed with some numerical methods.

Figure 2:
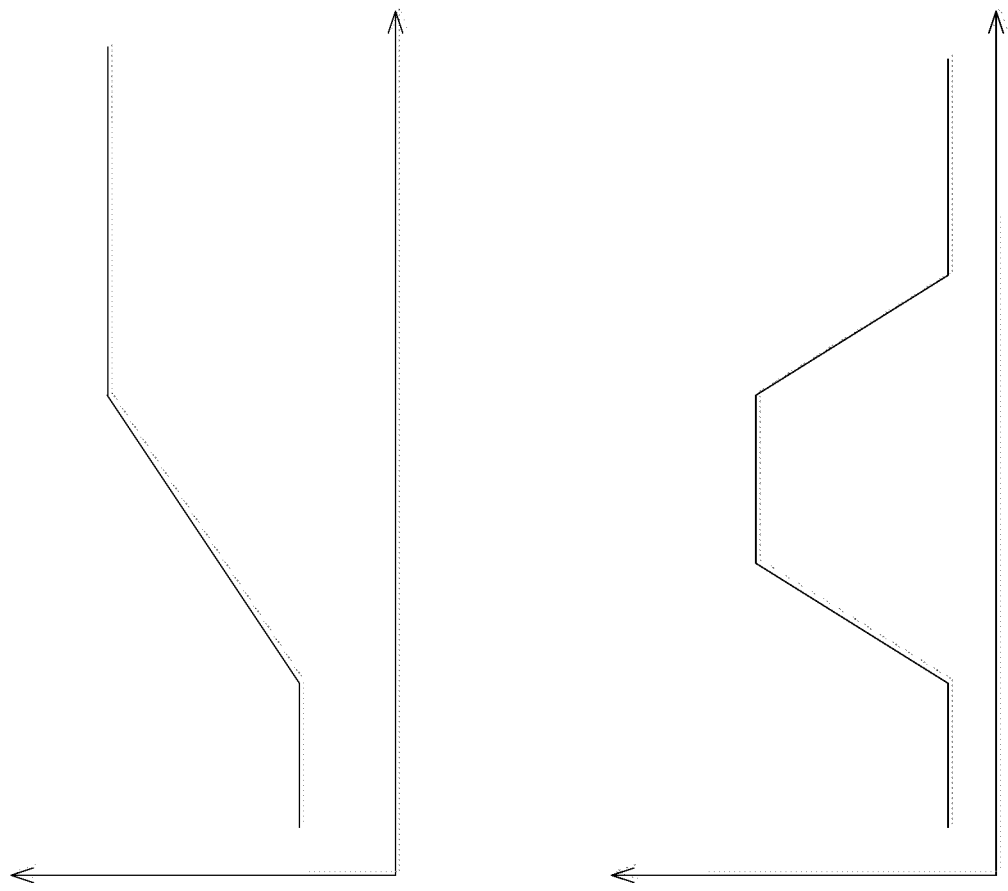
FIG. 2A shows a ramp transfer function.
FIG. 2B shows a trapezoid transfer function.

Notably, the transfer function that defines the scattering probability distribution is piecewise linear in most use cases of medical visualization. A piecewise linear transfer function is composed of multiple connected straight line segments. Together, these line segments define the shape of the transfer function. For example, as shown in FIGS. 2A and 2B the transfer function may be defined in a ramp or trapezoid shape, respectively. Because these functions are piece linear, there are some special properties that one can use to simplify their computation.

The transfer function is a constant for all points on a path and the integral has a simple solution:

$$I(x,\omega)=I^0(y,\omega') \cdot e^{-\sigma_s(s1s0)} \qquad \text{(Eqn. 3)}$$

Figure 3:
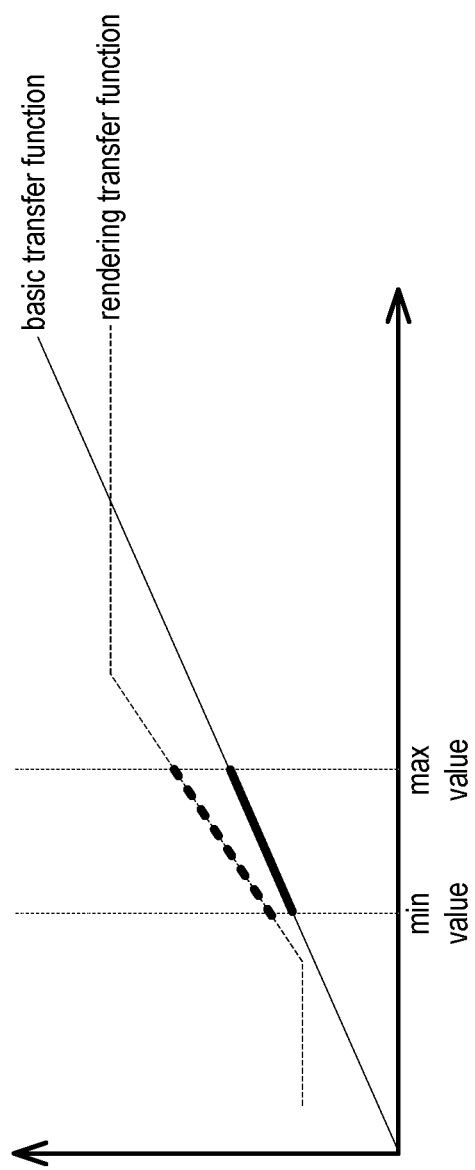
FIG. 3 shows an affine transformation between two line segments in two transfer functions.

For a ray satisfying that the intensities of all points are distributed on just one line segment on the function curve, the ray is linear (linear ray) under the specific transfer function and window level values. If the path integral for a linear ray has been computed for a transfer function and window level values ($TF\_WL_a$), the integral for the same ray under a different transfer function and window level values ($TF\_WL_b$) can be computed with the following equation as long as the same ray is also linear under $TF\_WL_b$. As shown in FIG. 3, there exists a unique affine transformation for any two line segments. As a result, the scattering probability of any point on the path in $TF\_WL_b$ is a linear function of the scattering probability in $TF\_WL_a$: $\sigma_{sb}(x) = t \cdot \sigma_{sa}(x) + t_0$. Thus, the path integral under $TF\_WL_b$ can be simplified as:

$$I_b(x, \omega) = I^0(y, \omega') \cdot e^{-\int_{s_0}^{s_1} \sigma_{sb}(x)dx} = I^0(y, \omega') \cdot e^{-\int_{s_0}^{s_1} (t\sigma_{sa}(x)+t_0)dx} = \quad \text{(Eqn. 4)}$$

$$I^0(y, \omega') \cdot e^{-t\int_{s_0}^{s_1} \sigma_{sa}(x)dx - t_0(s_1-s_0)} =$$

$$I^0(y, \omega') \cdot \left(e^{-\int_{s_0}^{s_1} \sigma_{sa}(x)dx}\right)^t \cdot e^{-t_0(s_1-s_0)}$$

Because $$e^{-\int_{s_0}^{s_1} \sigma_{sa}(x)dx}$$

has already been computed under $TF\_WL_a$, this provides a straightforward way to compute the path integral under $TF\_WL_b$.

Figure 4:
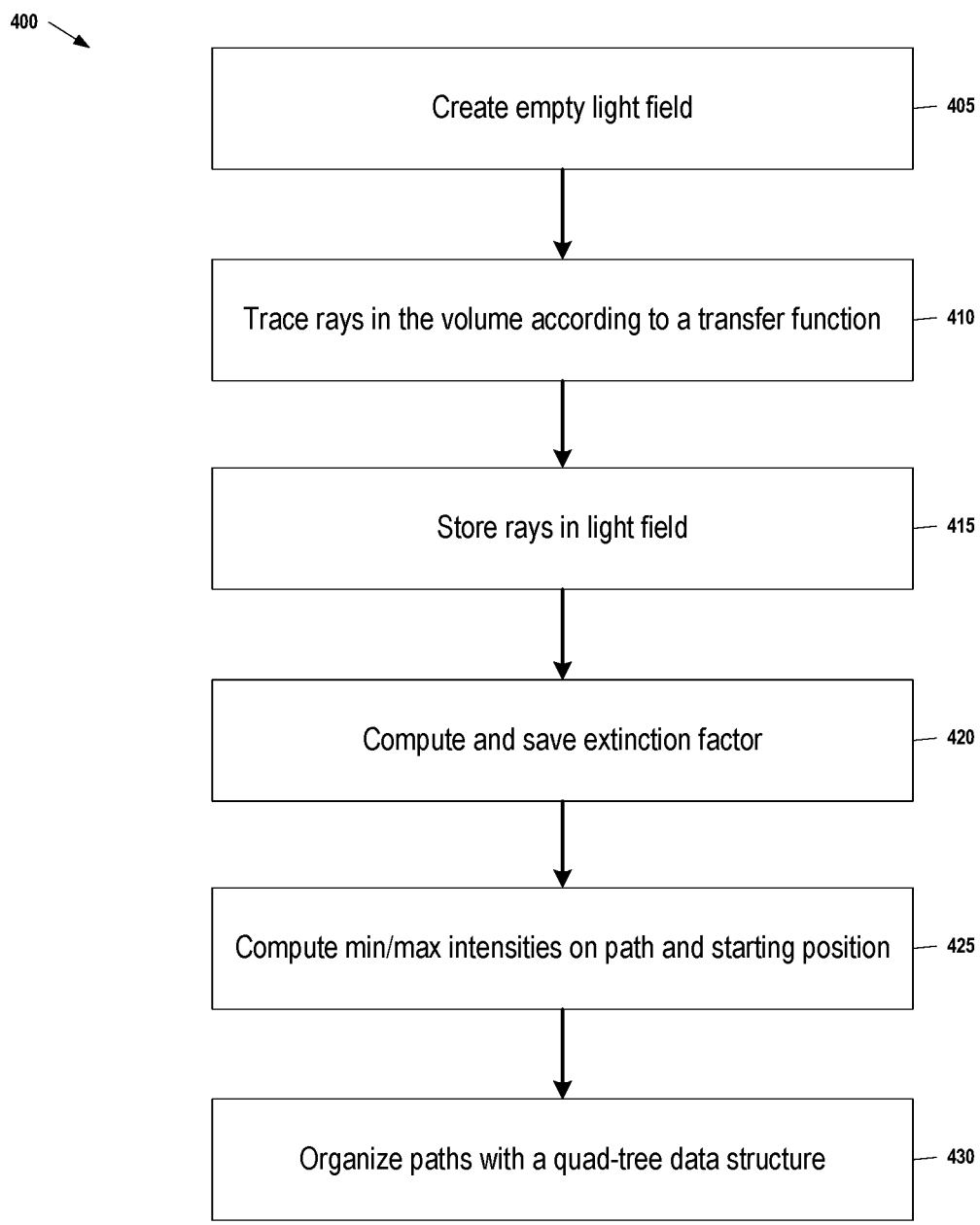
FIG. 4 provides a method for organizing light paths in a quad-tree data structure, according to some embodiments.
Figure 5:
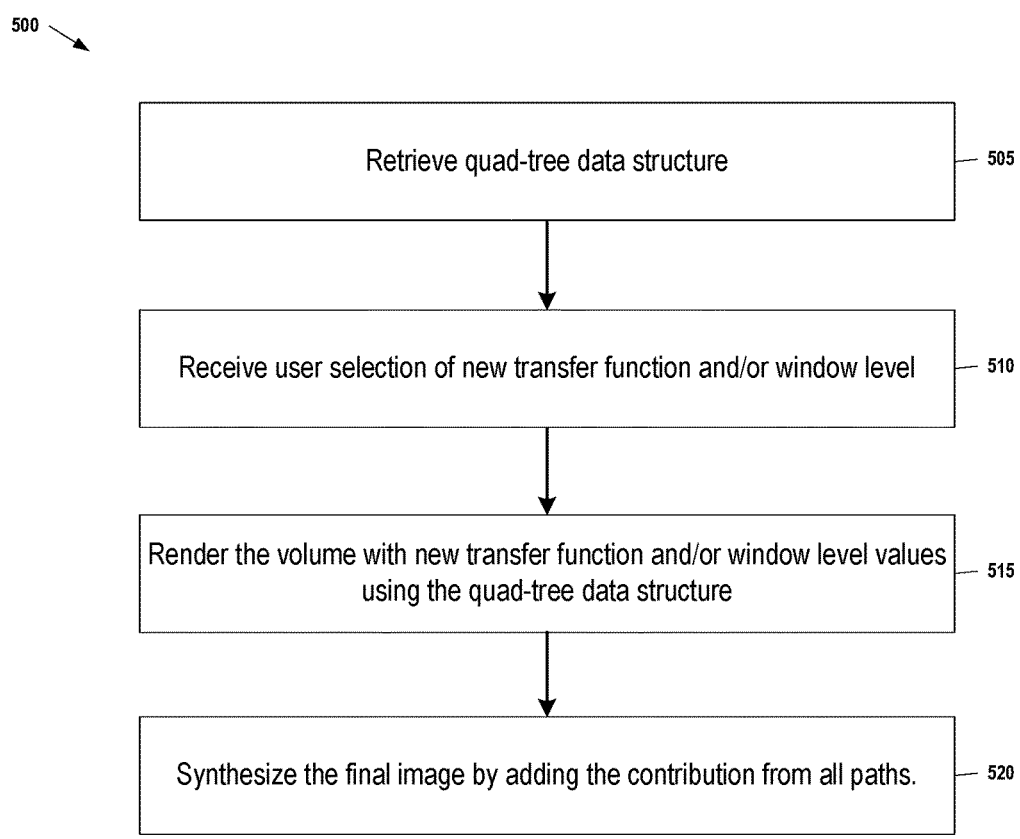
FIG. 5 provides a method for using a quad-tree data structure containing light paths to render a volume with a different transfer function and/or window level values than were used to generate the structure, according to some embodiments.
Figure 6:
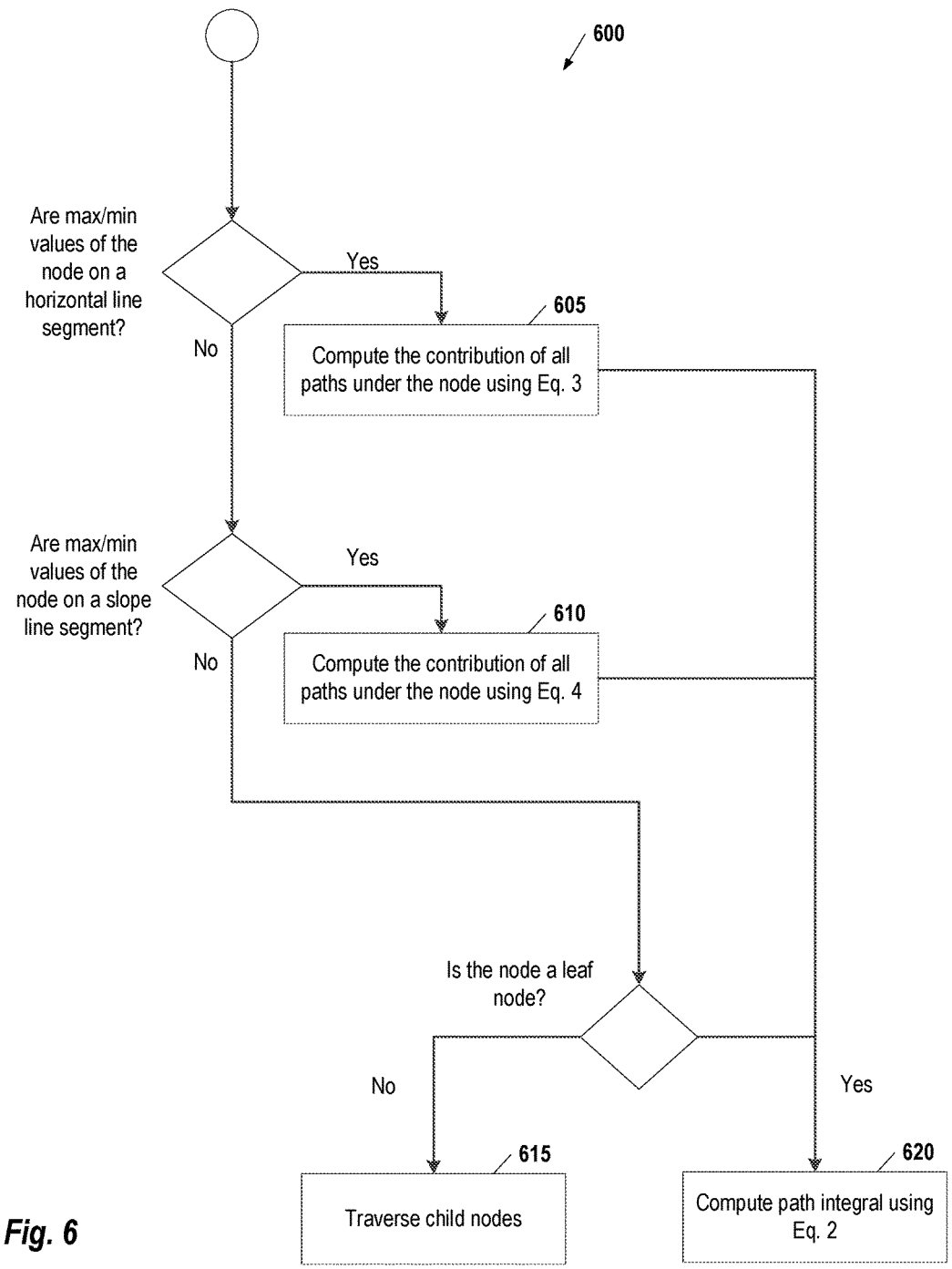
FIG. 6 provides an illustration of a process for reusing paths in the light field to render a volume with specific transfer function and window level values, according to some embodiments.

FIGS. 4-6 illustrates methods 400, 500, and 600 which collectively can be used for fast window-leveling of volumetric ray tracing, according to some embodiments. These methods 400, 500, and 600 are targeted at fast re-computation of the intensity of paths traced with MCRT under window-leveling or transfer function change operations.

FIG. 4 provides a method 400 for organizing light paths in a quad-tree data structure, according to some embodiments. Although a quad-tree is used in this example, in other embodiments other similar data structures may be employed (e.g., a K-D tree). Starting at 405, an empty light field for a given camera setup is constructed to store the paths traced with MCRT. As is commonly understood in the art, a light field represents the radiance as a function of position and direction in regions of space free of occluders. In such free space, the light field is a four dimensional function. Thus, the construction of a light field at step 405 may be performed by creating one or more matrix capable of storing four dimensional data.

Next, at step 410, the MCRT algorithm is used to trace rays in the volume with a basic transfer function that just linearly maps minimum volume intensity to 0 and maximum volume intensity to 1 or even the constant transfer function. Any path is linear under this transfer function. As described above, MCRT algorithms are generally known in the art and refer to techniques that solve the rendering equation using Monte Carlo integration. Briefly, samples of possible light paths are randomly traced to ultimately render the volume. For example, in some embodiments, a point within the pixel is randomly selected to shoot a ray onto a surface. Then, a direction is randomly selected to continue on the surface. This process is repeated until all the paths are determined. Once the rays are traced, at step 415, the rays are stored in the light field created at step 405.

Continuing with reference to FIG. 4, at step 420, the extinction factor of the path is computed and saved. Additionally, the min/max intensities on the path, the starting pixel position 425 are computed and saved. If the light source intensity is not a constant for all rays, intensity information may also be saved with the path. Then, at step 430, the paths are organized with a quad-tree data structure in the light field and the min/max values of the path are the two dimensions of the quads-tree. Each node in the quad-tree hierarchy has a set of min/max values and a group of paths.

Once the quad-tree data structure has been generated using the process 400 illustrated in FIG. 4, the structure may be used to render the volume with another transfer function and window level values. This process is illustrated on a high level in the process 500 shown in FIG. 5. At step 505, the quad-tree data structure is retrieved, for example, from local memory or a database providing long-term storage of the data. Along with the structure, the transfer function and window level used to generate the data may likewise be retrieved. At step 510, a user selection of a new transfer function and/or window level is received, for example, via a graphical user interface (GUI). It should be noted that this input may be transparent to the user. For example, adjustment of the window in the GUI may automatically trigger the change in window level that is received at step 510. Alternatively, the GUI may provide an interface that allows the user to directly input the transfer function and/or window levels. Next, at step 515, the volume is rendered with the new transfer function and/or window level values using the quad-tree data structure. This process is detailed below with respect to FIG. 6. Finally, at step 520, the final image is synthesized by adding the contribution from all paths in the rendered volume.

FIG. 6 provides an illustration of a process 600 for reusing paths in the light field to render a volume with specific transfer function and window level values, according to some embodiments. The quad-tree is traversed from top to bottom, applying the process 600 to each node. If the min/max values are on a horizontal line segment, Eqn. 3 is used at 605 to compute the contribution of all paths under the node. Otherwise, if the min/max values are on one slope line segment of the window-leveled transfer function, at 610, Eqn. 4 is used to compute the contribution of all paths under the node. If the node is not a leaf node, at 615, child nodes are traversed using the process 600. Otherwise, the path integral is computed at 620 using Eqn. 2. During this process 600, if all or most paths are linear or constant under the transfer function and window level values, the computation complexity is greatly reduced compared than using Eqn. 2. Therefore, it can improve the rendering speed significantly when the piecewise linear transfer function is simple.

In medical visualization, the combination of multiple simple piecewise linear transfer functions $\sigma_s = \Sigma_i \sigma_i$ is also frequently used. For example, the sum of a ramp transfer function for background and a trapezoid transfer function for highlighting some objects may be used. In these cases, the total transfer function is still piecewise linear but have many segments. The path integral in Eqn. 2 can be rewritten to $$I(x, \omega) = I^0(y, \omega') \cdot e^{-\int_{s_0}^{s_1} \sigma_s(x)dx} = I^0(y, \omega') \cdot e^{-\int_{s_0}^{s_1} \Sigma_i \sigma_i(x)dx} =$$

$$I^0(y, \omega') \cdot e^{\Sigma_i - \int_{s_0}^{s_1} \sigma_i(x)dx} = I^0(y, \omega') \cdot \Pi_i e^{-\int_{s_0}^{s_1} \sigma_i(x)dx}$$

Therefore, we can compute the extinction factor of each simple piecewise linear transfer function and multiply them together to get the extinction factor of the total transfer function. This is still much faster than directly using Eqn. 2.

Figure 7:
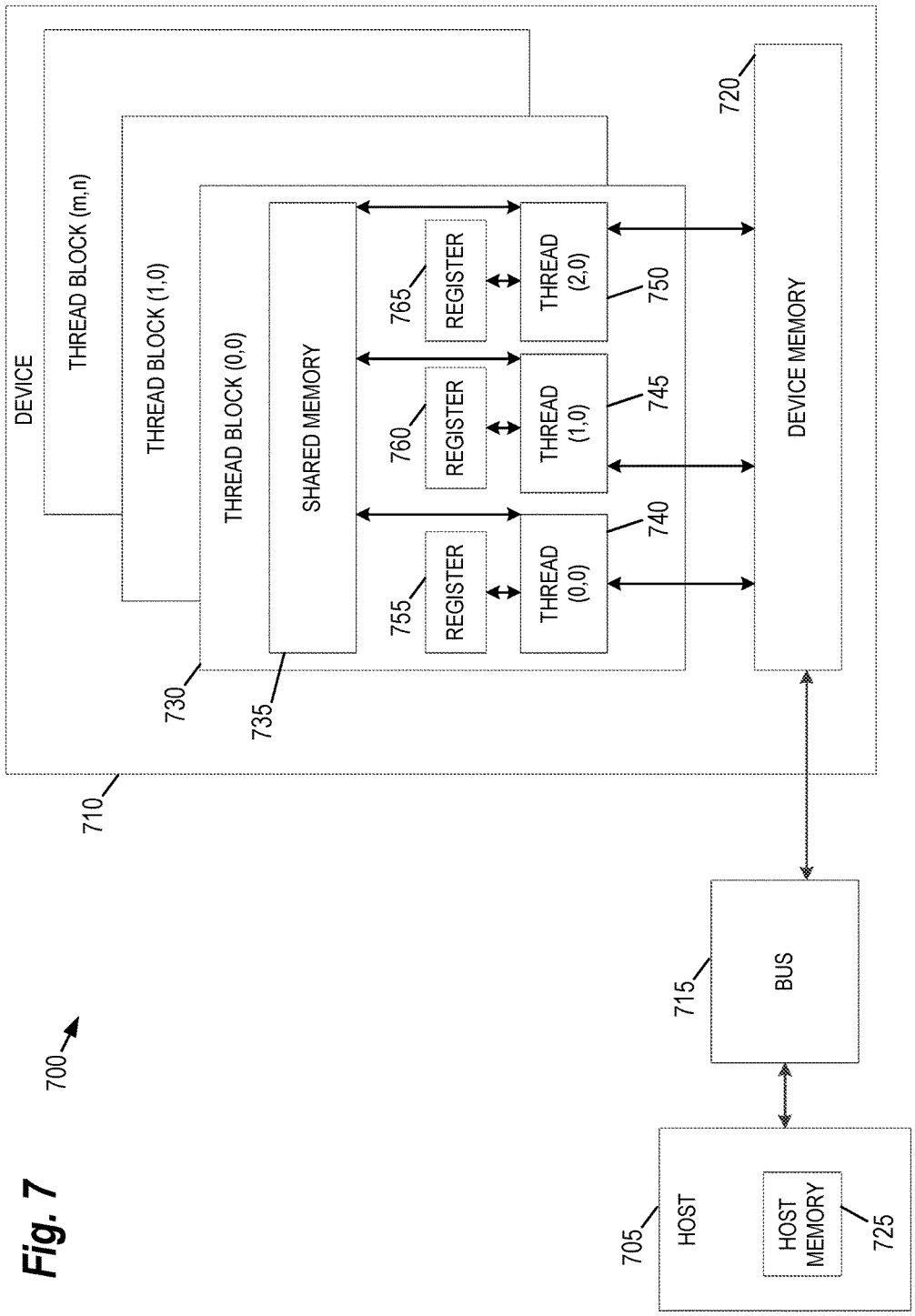
FIG. 7 provides an example of a parallel processing memory architecture that may be utilized to perform computations related to window-leveling of volumetric ray tracing, according to some embodiments.

FIG. 7 provides an example of a parallel processing memory architecture 700 that may be utilized to perform computations related to window-leveling of volumetric ray tracing, according to some embodiments. For example, the process 400 illustrated in FIG. 4 can be parallelized across rays to accelerate creation of the quad-tree data structure. Additionally (or alternatively) the process 600 shown in FIG. 6 maybe accelerated by processing multiple nodes of the quad-tree data structure in parallel. This architecture 700 may be used in embodiments of the present invention where NVIDIA™ CUDA (or a similar parallel computing platform) is used. The architecture includes a host computing unit ("host") 705 and a graphics processing unit (GPU) device ("device") 710 connected via a bus 715 (e.g., a PCIe bus). The host 705 includes the CPU (not shown in FIG. 7) and host memory 725 accessible to the CPU. The device 710 includes the GPU and its associated memory 720, referred to herein as device memory. The device memory 720 may include various types of memory, each optimized for different memory usages. For example, in some embodiments, the device memory includes global memory, constant memory, and texture memory.

Parallel portions of fast window-leveling of volumetric ray tracing applications may be executed on the architecture 700 as "device kernels" or simply "kernels." A kernel comprises parameterized code configured to perform a particular function. The parallel computing platform is configured to execute these kernels in an optimal manner across the architecture 700 based on parameters, settings, and other selections provided by the user. Additionally, in some embodiments, the parallel computing platform may include additional functionality to allow for automatic processing of kernels in an optimal manner with minimal input provided by the user.

The processing required for each kernel is performed by a grid of thread blocks (described in greater detail below). Using concurrent kernel execution, streams, and synchronization with lightweight events, the architecture 700 of FIG. 7 (or similar architectures) may be used to parallelize one or more operations associated with the processes 400, 500, 600 shown in FIGS. 4-6, respectively.

The device 710 includes one or more thread blocks 730 which represent the computation unit of the device 710. The term thread block refers to a group of threads that can cooperate via shared memory and synchronize their execution to coordinate memory accesses. For example, in FIG. 7, threads 740, 745 and 750 operate in thread block 730 and access shared memory 735. Depending on the parallel computing platform used, thread blocks may be organized in a grid structure. A computation or series of computations may then be mapped onto this grid. For example, in embodiments utilizing CUDA, computations may be mapped on one-, two-, or three-dimensional grids. Each grid contains multiple thread blocks, and each thread block contains multiple threads. For example, in FIG. 7, the thread blocks 730 are organized in a two dimensional grid structure with m+1 rows and n+1 columns. Generally, threads in different thread blocks of the same grid cannot communicate or synchronize with each other. However, thread blocks in the same grid can run on the same multiprocessor within the GPU at the same time. The number of threads in each thread block may be limited by hardware or software constraints.

Continuing with reference to FIG. 7, registers 755, 760, and 765 represent the fast memory available to thread block 730. Each register is only accessible by a single thread. Thus, for example, register 755 may only be accessed by thread 740. Conversely, shared memory is allocated per thread block, so all threads in the block have access to the same shared memory. Thus, shared memory 735 is designed to be accessed, in parallel, by each thread 740, 745, and 750 in thread block 730. Threads can access data in shared memory 735 loaded from device memory 720 by other threads within the same thread block (e.g., thread block 730). The device memory 720 is accessed by all blocks of the grid and may be implemented using, for example, Dynamic Random-Access Memory (DRAM).

Each thread can have one or more levels of memory access. For example, in the architecture 700 of FIG. 7, each thread may have three levels of memory access. First, each thread 740, 745, 750, can read and write to its corresponding registers 755, 760, and 765. Registers provide the fastest memory access to threads because there are no synchronization issues and the register is generally located close to a multiprocessor executing the thread. Second, each thread 740, 745, 750 in thread block 730, may read and write data to the shared memory 735 corresponding to that block 730. Generally, the time required for a thread to access shared memory exceeds that of register access due to the need to synchronize access among all the threads in the thread block. However, like the registers in the thread block, the shared memory is typically located close to the multiprocessor executing the threads. The third level of memory access allows all threads on the device 710 to read and/or write to the device memory 720. Device memory 720 requires the longest time to access because access must be synchronized across the thread blocks operating on the device. Thus, in some embodiments, the processing of each seed point is coded such that it primarily utilizes registers and shared memory and only utilizes device memory as necessary to move data in and out of a thread block.

The embodiments of the present disclosure may be implemented with any combination of hardware and software. For example, aside from parallel processing architecture presented in FIG. 7, standard computing platforms (e.g., servers, desktop computer, etc.) may be specially configured to perform the techniques discussed herein. In addition, the embodiments of the present disclosure may be included in an article of manufacture (e.g., one or more computer program products) having, for example, computer-readable, non-transitory media. The media may have embodied therein computer readable program code for providing and facilitating the mechanisms of the embodiments of the present disclosure. The article of manufacture can be included as part of a computer system or sold separately.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

A graphical user interface (GUI), as used herein, comprises one or more display images, generated by a display processor and enabling user interaction with a processor or other device and associated data acquisition and processing functions. The GUI also includes an executable procedure or executable application. The executable procedure or executable application conditions the display processor to generate signals representing the GUI display images. These signals are supplied to a display device which displays the image for viewing by the user. The processor, under control of an executable procedure or executable application, manipulates the GUI display images in response to signals received from the input devices. In this way, the user may interact with the display image using the input devices, enabling user interaction with the processor or other device.

The functions and process steps herein may be performed automatically or wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 35 U.S.C. 112, sixth paragraph, unless the element is expressly recited using the phrase "means for."

The invention claimed is:

1. A computer-implemented method for performing window-leveling of volumetric ray tracing, the method comprising:
    tracing, by the computer system, a plurality of rays in the volume according to a first piecewise linear transfer function, wherein the first piecewise linear transfer function includes a plurality of first connected straight line segments;
    generating, by the computer system, a plurality of light paths based on the plurality of rays, wherein intensities of all points on each light path are distributed on one of the plurality of first connected straight line segments;
    computing, by the computer system, maximum and minimum intensities for each of the plurality of light paths;
    organizing, by the computer system, the plurality of light paths and the maximum and minimum intensities for each of the plurality of light paths into a quad-tree data structure;
    retrieving, by a computer system, the quad-tree data structure organizing a plurality of light paths associated with a volume rendered using the first piecewise linear transfer function and one or more first window level values;
    receiving, by the computer system, a user selection of a second piecewise linear transfer function and second window level values, wherein the second piecewise linear transfer function includes a plurality of second connected straight line segments;
    rendering, by the computer system, the volume with the second piecewise linear transfer function and the second window level values using the quad-tree data structure, wherein the intensities of all points on each light path are distributed on one of the plurality of second connected straight line segments, and a scattering probability of each point on each light path with respect to the second piecewise linear transfer function is a linear function of the scattering probability of a corresponding point on each light path with respect to the first piecewise linear transfer function; and
    synthesizing, by the computer system, an image by adding contributions from all of the plurality of light paths according to the quad-tree data structure;
    wherein the step of organizing the plurality of light paths and the maximum and minimum intensities for each of the plurality of light paths into a quad-tree data structure further comprises:
        computing an extinction factor for each of the plurality of light paths; and
        storing the extinction factor for each of the plurality of light paths in the quad-tree data structure;
    wherein the volume is rendered with the second piecewise linear transfer function and the second window level values by processing each respective node in the quad-tree data structure with a path integral calculation process comprising:
        if the maximum and minimum intensities corresponding to the respective node are on a horizontal line segment, computing contributions for all paths under the respective node using a first integral function which assumes a constant transfer function;
        if the maximum and minimum intensities corresponding to the respective node are on a one slope line segment of the second piecewise linear transfer function, computing contributions for all paths under the respective node using a second integral function which is based on an affine transformation between the first piecewise linear transfer function and the second piecewise linear transfer function;
        if the respective node is not a leaf node, traversing children nodes of the respective node using the path integral calculation process; and
        if the respective node is a leaf node, computing a path integral for the respective node.

2. The method of claim 1, wherein the computer system is a parallel computing platform and the plurality of rays in the volume are traced in parallel.

3. The method of claim 1, wherein the plurality of rays are traced using a Monte Carlo Ray Tracing (MCRT) algorithm.

4. The method of claim 3, wherein the MCRT algorithm traces the plurality of rays in the volume using the first piecewise linear transfer function, wherein the first piecewise linear transfer function linearly maps minimum volume intensity to 0 and maximum volume intensity to 1.

5. The method of claim 3, wherein the MCRT algorithm traces the plurality of rays in the volume using the first piecewise linear transfer function, wherein the first piecewise linear transfer function is a constant transfer function.

6. The method of claim 1, wherein the quad-tree generating process further comprises:

identifying a subset of the plurality of light paths wherein, for each respective path in the subset, light source intensity is not constant for all rays in the respective path; and storing intensity information for each respective path in the subset in the quad-tree data structure.

7. The method of claim 1, wherein the computer system is a parallel computing platform and the path integral calculation process is performed on multiple nodes in the quad-tree data structure in parallel.

8. An article of manufacture for performing window-leveling of volumetric ray tracing, the article of manufacture comprising a non-transitory computer-readable medium holding computer-executable instructions for performing a method comprising:

generating a quad-tree data structure organizing a plurality of light paths associated with a volume rendered using a first piecewise linear transfer function and one or more first window level values, wherein the first piecewise linear transfer function includes a plurality of first connected straight line segments, and intensities of all points on each light path are distributed on one of the plurality of first connected straight line segments;

rendering the volume with a second piecewise linear transfer function including a plurality of second connected straight line segments and second window level values using the quad-tree data structure, wherein the intensities of all points on each light path are distributed on one of the plurality of second connected straight line segments, and a scattering probability of each point on each light path with respect to the second piecewise linear transfer function is a linear function of the scattering probability of a corresponding point on each light path with respect to the first piecewise linear transfer function; and synthesizing an image by adding contributions from all of the plurality of light paths according to the quad-tree data structure;

wherein the quad-tree generating process further comprises:
computing an extinction factor for each of the plurality of light paths; and
storing the extinction factor for each of the plurality of light paths in the quad-tree data structure;

wherein the volume is rendered with the second piecewise linear transfer function and the second window level values by processing each respective node in the quad-tree data structure with a path integral calculation process comprising:

if the maximum and minimum intensities corresponding to the respective node are on a horizontal line segment, computing contributions for all paths under the respective node using a first integral function which assumes a constant transfer function;

if the maximum and minimum intensities corresponding to the respective node are on a one slope line segment of the second piecewise linear transfer function, computing contributions for all paths under the respective node using a second integral function which is based on an affine transformation between the first piecewise linear transfer function and the second piecewise linear transfer function;

if the respective node is not a leaf node, traversing children nodes of the respective node using the path integral calculation process; and if the respective node is a leaf node, computing a path integral for the respective node.

9. The article of manufacture of claim 8, wherein the quad-tree data structure is generated by a quad-tree generating process comprising:

tracing a plurality of rays in the volume according to the first piecewise linear transfer function;
generating a plurality of paths based on the plurality of rays;
computing maximum and minimum intensities for each of the plurality of light paths; and
organizing the plurality of light paths and the maximum and minimum intensities for each of the plurality of light paths into the quad-tree data structure.

10. The article of manufacture of claim 9, wherein the plurality of rays are traced using an MCRT algorithm which traces the plurality of rays in the volume using the first piecewise linear transfer function, wherein the first piecewise linear transfer function linearly maps minimum volume intensity to 0 and maximum volume intensity to 1.

11. The article of manufacture of claim 9, wherein the plurality of rays are traced using an MCRT algorithm which traces the plurality of rays in the volume using the first piecewise linear transfer function, wherein the first piecewise linear is a constant transfer function.

12. The article of manufacture of claim 8, wherein the quad-tree generating process further comprises:

identifying a subset of the plurality of light paths wherein, for each respective path in the subset, light source intensity is not constant for all rays in the respective path; and storing intensity information for each respective path in the subset in the quad-tree data structure.

13. A system for performing window-leveling of volumetric ray tracing, the system comprising:

a database configured to store a tree data structure organizing (i) a plurality of light paths associated with a volume rendered using a first piecewise linear transfer function and one or more first window level values and (ii) maximum and minimum intensities for each of the plurality of light paths, wherein the first piecewise linear transfer function includes a plurality of first connected straight line segments, and intensities of all points on each light path are distributed on one of the plurality of first connected straight line segments; and a plurality of processors configured to render the volume with a second piecewise linear transfer function including a plurality of second connected straight line segments and second window level values using the tree data structure by processing each respective node in the tree data structure with a path integral calculation process, wherein the intensities of all points on each light path are distributed on one of the plurality of second connected straight line segments, and a scattering probability of each point on each light path with respect to the second piecewise linear transfer function is a linear function of the scattering probability of a corresponding point on each light path with respect to the first piecewise linear transfer function, wherein the path integral calculation process comprising:

if the maximum and minimum intensities corresponding to the respective node are on a horizontal line segment, computing contributions for all paths under the respective node using a first integral function which assumes a constant transfer function, if the maximum and minimum intensities corresponding to the respective node are on a one slope line segment of the second piecewise linear transfer function, computing contributions for all paths under the respective node using a second integral function which is based on an affine transformation between the first piecewise linear transfer function and the second piecewise linear transfer function, if the respective node is not a leaf node, traversing children nodes of the respective node using the path integral calculation process, and if the respective node is a leaf node, computing a path integral for the respective node.

14. The system of claim 13, wherein the path integral calculation process is performed on multiple nodes in the tree data structure in parallel by the plurality of processors.

15. The system of claim 13, wherein the tree data structure is a quad-tree data structure.

* * * * *